United States Patent
Spitler et al.

[11] Patent Number: 6,026,768
[45] Date of Patent: Feb. 22, 2000

[54] HEAT DEFLECTION SYSTEM FOR A LAWN TRACTOR

[75] Inventors: Charles R. Spitler, Haw River; William M. Bezilla, Pittsboro, both of N.C.; Hitoshi Fujii; Masatoshi Nagaoka, both of Saitama, Japan

[73] Assignee: Honda Giken Kogyo Kabushiki Kaisha, Tokyo, Japan

[21] Appl. No.: 09/163,553

[22] Filed: Sep. 30, 1998

[51] Int. Cl.[7] ............................. F01B 7/02; B60K 11/08
[52] U.S. Cl. .................. 123/41.58; 180/68.1; 123/41.7
[58] Field of Search ......................... 123/41.58, 41.56, 123/41.7; 180/68.1

[56] References Cited

U.S. PATENT DOCUMENTS

| | | | |
|---|---|---|---|
| 3,987,766 | 10/1976 | Welck | 123/41.66 |
| 4,432,309 | 2/1984 | Hutchison et al. | 123/41.66 |
| 4,886,135 | 12/1989 | Nakamura et al. | 180/68.1 |
| 4,891,940 | 1/1990 | Tamba et al. | 60/320 |
| 4,903,485 | 2/1990 | Tamba et al. | 60/320 |
| 4,938,303 | 7/1990 | Schaal et al. | 180/68.1 |
| 5,029,668 | 7/1991 | Murakawa et al. | 181/240 |
| 5,113,819 | 5/1992 | Murakawa et al. | 123/198 E |
| 5,174,406 | 12/1992 | Lee | 180/68.2 |
| 5,207,187 | 5/1993 | Kurohara et al. | 123/41.7 |
| 5,284,115 | 2/1994 | Imanishi et al. | 123/41.7 |
| 5,359,159 | 10/1994 | Gommel | 181/230 |
| 5,689,953 | 11/1997 | Yamashita et al. | 60/316 |

*Primary Examiner*—Andrew M. Dolinar
*Assistant Examiner*—Mahmoud M. Gimie
*Attorney, Agent, or Firm*—Armstrong, Westerman, Hattori, McLeland & Naughton

[57] ABSTRACT

A heat deflection system is provided for a lawn tractor which has an engine mounted on a chassis and enclosed within an engine enclosure. The engine enclosure has a top, sides and a front grille. The engine also includes a carburetor, an exhaust header and a muffler. The heat deflection system includes a heat shield having at least a portion thereof disposed between the exhaust header and carburetor, a partition having openings therein, wherein the openings extend above the muffler, such that the heated air from the muffler rises and passes through the openings, and the heat deflector extending above the partition for directing soak heat from the muffler away from the carburetor.

22 Claims, 2 Drawing Sheets

HEAT DEFLECTION SYSTEM FOR A LAWN TRACTOR

BACKGROUND OF THE INVENTION

The present invention relates to a heat deflection system for a lawn tractor. More particularly, it relates to a heat deflection system for a lawn tractor in which an enclosed engine must have cooling passages, even after the engine has been turned off.

Many lawn tractors are now manufactured with the engine enclosed within a hood or other type of engine enclosure. Heat created by the engine during operation must be evacuated from the hood to prevent overheating in the engine and its components. Such engines are either air-cooled or water-cooled to control the operating temperature of the engine. Usually, a fan is associated with either type of cooling system and draws cool air into the hood and forces it over the engine and its components in order to provide cooling.

A problem arises when the engine is turned off. When the engine is turned off, the fan no longer is functioning to keep the engine cool. Thus, heat often builds up, from the engine and its components, including the muffler, inside of the hood itself. Often such heat will cause a malfunction, such as vapor lock in the carburetor. This residual heat is referred to as soak heat. This soak heat, which arises particularly from the exhaust manifold and the muffler, becomes trapped inside the hood. When the carburetor is above the muffler, as it is in most lawn tractors, this soak heat directly affects the carburetor and may cause vapor lock. While many prior art lawn tractors have extensive ducting to control the flow of cooling air during operation of the engine, the problem of soak heat has not been generally dealt with.

SUMMARY OF THE INVENTION

Accordingly, the present invention is provided in order to overcome the problem of soak heat in a lawn tractor having an enclosed engine. Elements are provided in the heat deflection system of the instant invention in order to deflect soak heat, rising from the muffler and the exhaust header, outside of the engine enclosure and, particularly, away from the carburetor.

Another feature of the instant invention is that the elements, such as a heat shield, a partition and a heat deflector, all function together in order to direct the muffler soak heat out through the front grille of the tractor hood. In the use of a lawn tractor, often an operator, after finishing a work operation such as cutting the grass, may stop the lawn tractor for a specified period of time, such as for lunch or to take a break for a cool drink. When the operator returns, if the engine does not have time to completely cool off, the carburetor may still be effected by the soak heat from the muffler. Accordingly, the instant invention is provided to avoid the problem of vapor lock, if the carburetor has not had time to completely cool down. The soak heat from the exhaust manifold and, in particular the muffler, is directed by way of the elements of the heat deflection system, in accordance with the instant invention, away from the carburetor specifically, and most of it flows out through the open front grille.

Furthermore, it should be noted that in accordance with the instant invention, the heat deflection system is provided for a lawn tractor having an engine mounted on the chassis and enclosed within an engine enclosure having a top, sides and a front grille. The engine includes a carburetor, an exhaust header and a muffler. The heat deflection system includes a heat seal having at least a portion thereof disposed between the exhaust header and the carburetor, a partition having openings therein, wherein the openings extend above the muffler such that heated air from the muffler rises and passes through the openings, and a heat deflector extending above the partition for directing soak heat from the muffler away from the carburetor.

DETAILED DESCRIPTION OF THE INVENTION

Figure 1:
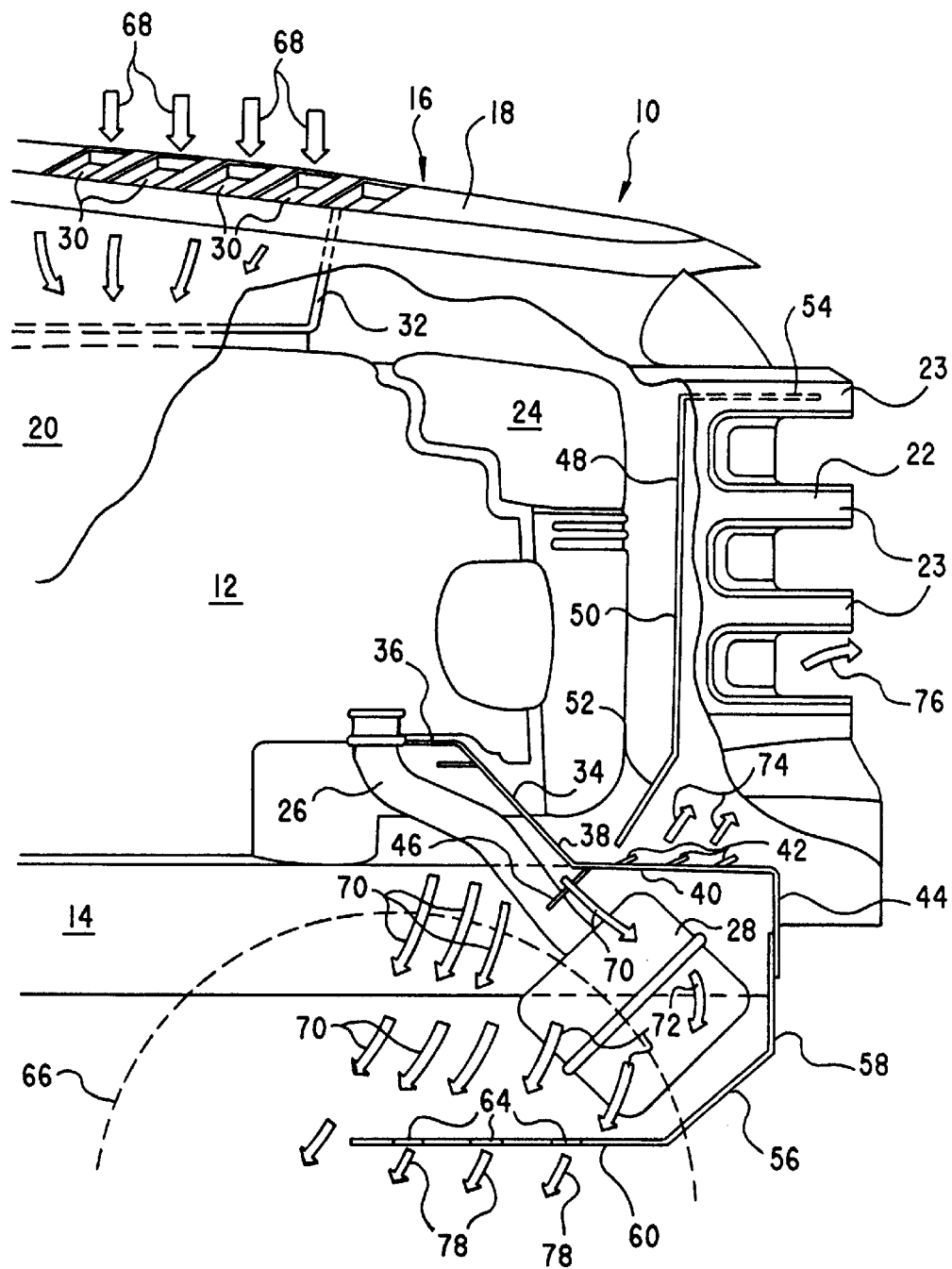
FIG. 1 is a partial cutaway, side view of an engine compartment of a lawn tractor, illustrating the air flow through the engine compartment when the engine is running.
Figure 2:
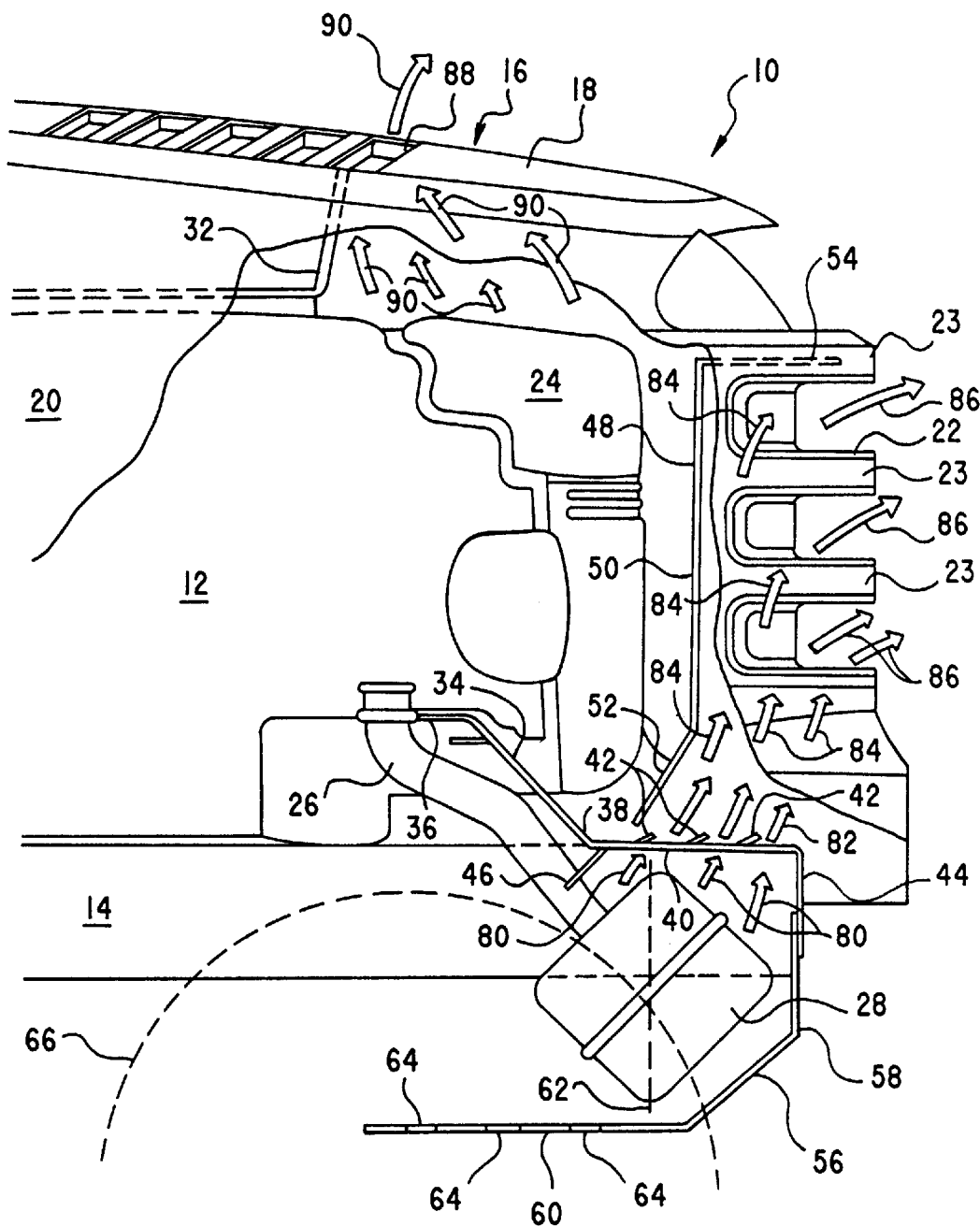
FIG. 2 is a partial cutaway, side view of an engine compartment of a lawn tractor, illustrating the present invention in the flow of soak heat when the engine is turned off.

FIGS. 1 and 2 both illustrate partial cutaway, side views of the front portion of a lawn tractor 10. An engine 12 is mounted on chassis 14 and within the engine enclosure generally referred to by reference numeral 16. Engine enclosure 16 includes a top 18, right and left sides 20, and front grille 22. Front grille 22 has a plurality of ribs 23 extending forwardly therefrom. Engine 12 includes a carburetor 24 disposed on an upper, forward portion of engine 12. An exhaust header 26 extends forwardly and downwardly from engine 12 and into a muffler 28 disposed in a forward, lower portion of the lawn tractor 10. Engine 12 illustrated in FIGS. 1 and 2, is a V-twin air-cooled engine. Of course, any other type of appropriate engine may be used, including water-cooled, single- or multi-cylinder engine. The crankshaft is oriented vertically, and drives an engine fan (not shown). The engine fan draws air in through intake vents 30 into plenum 32. This air then flows over the engine 12 and its components to cool it off. Specific air flow will be described below. The muffler generally expels exhaust gas out the side of the tractor.

The heat deflection system in accordance with the instant invention includes a heat shield 34, a partition 40 and a heat deflector 48. Heat shield 34 extends above exhaust header 26 and is thus disposed between the exhaust header 26 and carburetor 24. Heat shield 34 has an upper portion 36 positioned close to an area where the exhaust header 26 exits from engine 12. Heat shield 34 extends forwardly and downwardly to lower portion 38 of heat shield 34. Lower portion 38 of heat shield 34 extends near to or comes into contact with partition 40. In fact, lower portion 38 of heat shield 34 extends at least partially over a rear portion of muffler 28.

Partition 40 is disposed generally horizontally above muffler 28. Partition 40 has a front portion 44 and a rear portion 46. Front portion 44 extends downwardly from the forwardmost horizontal portion of partition 40 and in front of a portion of muffler 28. Rear portion 46 of partition 40 extends downwardly and rearwardly from a rear portion of partition 40. Louvers 42 are formed on top of partition 40 and have openings toward the front of the tractor. These openings are toward the front grille 22 and are away from carburetor 24. Louvers 42 and their openings, of course allow rising air to flow through them and out through front grille 22. Heat shield 34 and partition 40 may be made separately or may be made internally as one piece. They may be fixed together if they are separate, however, they need not be attached to one another.

Heat deflector 48 is disposed behind front grille 22 and has a standard portion (or upright porion) 50 extending basically across the width engine enclosure. Standard portion 50 includes an angled lower section 52. Furthermore, a horizontal flange 54 extends forwardly from a top of standard portion 50 of heat deflector 48. Horizontal flange 54 extends into the uppermost rib 23 of grille 22. Angled lower section 52 of heat deflector 48 is angled rearwardly and downwardly in order to prevent rising hot air, from louvers 42, from drifting into the engine compartment and heating up carburetor 24. Thus, heat deflector 48 is disposed between louvers 42 and carburetor 24.

Furthermore, a muffler protector 56 is also provided in order to prevent objects and grass from contacting the muffler and damaging it. Muffler protector 56 includes a first portion 58 which extends downwardly from front portion 44 of partition 40. Muffler protector 56 may be connected to partition 40, which is mounted on the chassis 14, by any appropriate means such as welding, bolting, etc. First portion 58 extends downwardly from front portion 44 of partition 40 and across the front of muffler 28. A second portion 60 of muffler protector 56 extends rearwardly from a bottom edge of the first portion 58 and below the muffler 28. Slots 64 are formed in second portion 60 of muffler protector 56. Front tire 66 is indicated in phantom.

FIG. 1 illustrates the operation of the cooling system of engine 12 when the engine is in operation. Intake air, indicated by arrow 68, is drawn in through intake vents 30 into plenum 32 by way of a fan (not shown). The air flow over the motor and past the exhaust header is indicated by arrows 70. Also, air flows past muffler 28 as indicated by arrows 72. Some cooling air, driven by the fan, also exits out through louvers 42. This is indicated by arrow 74. Some of this air also exits through front grille 22, as illustrated by arrow 76. Slots 64 are formed on second portion 60 of muffler protector 66. Arrows 78 indicate the cooling air that has flown over the exhaust header 26 and/or muffler 28 and through slots 64, formed in second portion 60. Thus, the heat given off by engine 12, exhaust header 26, and muffler 28 is carried away by the cooling air. This flow of air controls the temperature inside of the engine compartment only when the engine is running.

FIG. 2 illustrates the operation of heat deflection system, when the engine is shut off. Since the fan does not circulate air through the engine compartment when the engine is shut off, soak heat from exhaust header 26 and muffler 28 continues to rise. The heat deflection system according the instant invention prevents such rising heat from directly heating the carburetor 24, thus causing vapor lock or other problems. Specifically, heat shield 34, which extends across the width of the engine enclosure, prevents heat from rising from exhaust header 26 up toward the carburetor. Soak heat given off by muffler 28 is indicated by arrows 80. This soak heat (or hot air) passes upwardly through the openings of louvers 42 of partition 40. This soak heat is indicated by a group of arrows 82. Angled lower section 52 of heat deflector 48 is positioned above the rearmost louver 42 of partition 40. Thus heat exiting out of rearmost louver 42 is deflected toward front grille 22. Thus, substantially none of the hot air exiting louvers 42 (indicated by arrows 82) is allowed to drift behind heat deflector 48 and heat up carburetor 24. Arrows 84 indicate the rising heat between standard portion 50 of heat deflector 48 and front grille 22. Horizontal flange 54 of heat deflector 48, which extends into uppermost rib 23 of front grille 22, directing all the rising hot air up through grille 22 and to exit into the environment as illustrated by arrows 86. Thus, the soak heat from the muffler is mostly expelled out through front grille 22. It should be noted that rear portion 46 of partition 40 assist in helping rising air from a rear portion of muffler 28 to flow out through the openings provided by louvers 42. Further, any soak heat that should accumulate within the engine compartment, due to the residual heat of the engine itself, will exit through front vent 88 on the top 18 of engine enclosure 16. As seen in FIG. 2, front vent 88 is not in communication with plenum 32 and thus can easily allow the exhausting of any residual soak heat in the engine compartment itself. It should be noted that at least some of louvers 42 are positioned forward of centerline 62 of muffler 28. This encourages the soak heat to be expelled forwardly so that it may exit easily through front grille 22. Thus, the soak heat is properly expelled and the carburetor is prevented from becoming too hot from the soak heat.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A heat deflection system for a lawn tractor having an engine mounted on a chassis and enclosed within an engine enclosure having a top, sides and a front grille, the engine including a carburetor, an exhaust header and a muffler, said heat deflection system comprising:

a heat shield having at least a portion thereof disposed between the exhaust header and the carburetor;

a partition having openings therein, said openings extending above the muffler, such that soak heat from the muffler rises and passes through said openings; and a heat deflector extending above said partition for directing soak heat from the muffler away from the carburetor.

2. The heat deflection system of claim 1, wherein said heat deflector has a standard portion extending generally upwardly from a position near said partition.

3. The heat deflection system of claim 2, wherein said heat deflector is positioned between the front grille and the carburetor.

4. The heat deflection system of claim 3, wherein said heat deflector has a generally horizontal flange at a top end thereof, said horizontal flange extending toward said grille, such that rising hot air is expelled outwardly through the front grille.

5. The heat deflection system of claim 4, wherein the front grille has a plurality of ribs with openings therebetween, and wherein said horizontal flange of said heat deflector extends into one of the ribs.

6. The heat deflection system of claim 1, wherein said heat shield is disposed above the exhaust header.

7. The heat deflection system of claim 6, wherein said heat shield is partially disposed above the muffler.

8. The heat deflection system of claim 1, wherein said heat shield and said partition are connected together.

9. The heat deflection system of claim 1, wherein said heat shield and said partition are formed as one piece.

10. The heat deflection system of claim 1, wherein said partition is mounted on the chassis.

11. The heat deflection system of claim 2, wherein said partition has louvers open toward the front grille.

12. The heat deflection system of claim 11, wherein a lowermost portion of said standard portion of said heat deflector is disposed near said partition, such that said louvers are between said lowermost portion of said standard portion and the front grille.

13. The heat deflection system of claim 12, wherein said louvers are closed in the direction of the carburetor.

14. The heat deflection system of claim 11, wherein said louvers are located forward of a vertical centerline of the muffler.

15. The heat deflection system of claim 1, further comprising a muffler protector having a first portion extending across a front of the muffler and a second portion extending rearwardly from a bottom edge of said first portion and below the muffler.

16. The heat deflection system of claim 15, wherein said second portion has a plurality of slots.

17. The heat deflection system of claim 15, wherein said first portion is mounted on the chassis, and adjacent said partition.

18. The heat deflection system of claim 15, wherein said heat shield, said partition and said muffler protector together define a cooling air path.

19. The heat deflection system of claim 1, further comprising a vent disposed on the top of the engine enclosure, near said carburetor.

20. A heat deflection system for a lawn tractor having an engine mounted on a chassis and enclosed within an engine enclosure having a top, sides and a front grille, the engine including a carburetor, an exhaust header and a muffler, said heat deflection system comprising:

a heat shield positioned above the exhaust header and below the carburetor;

a partition extending forwardly from a lower portion of said heat shield, said partition having openings above the muffler, such that soak heat from the muffler rises and passes through said openings; and a heat deflector extending upwardly from a position near said partition, such that said heat deflector is disposed between said openings in said partition and the carburetor, for directing soak heat from the muffler away from the carburetor.

21. The heat deflection system of claim 20, wherein said partition has louvers presenting said openings, said openings facing away from the carburetor and toward the front grille.

22. A heat deflection system of claim 21, further comprising a muffler protector having a first portion extending downwardly from said partition and across the front of the muffler, and a second portion extending rearwardly from said first portion and below the muffler.

* * * * *